United States Patent
Dorenbosch et al.

(10) Patent No.: US 7,162,236 B2
(45) Date of Patent: Jan. 9, 2007

(54) FAST CALL SET-UP FOR MULTI-MODE COMMUNICATION

(75) Inventors: Jheroen P. Dorenbosch, Paradise, TX (US); Jack A. Gipson, Fort Worth, TX (US); Ajaykumar R. Idnani, Schaumburg, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/831,822

(22) Filed: Apr. 26, 2004

(65) Prior Publication Data

US 2005/0239498 A1    Oct. 27, 2005

(51) Int. Cl.
*H04Q 7/20* (2006.01)
*H04M 1/00* (2006.01)

(52) U.S. Cl. ............... 455/432.1; 455/426.1; 455/435.1; 455/435.3; 455/445; 455/552.1; 455/553.1; 370/338

(58) Field of Classification Search ........... 455/41.2, 455/414.1, 417, 432.1, 434, 435.1–435.3, 455/436–444, 445, 452.2, 552.1–553.1, 453.3, 455/512–513, 426.1, 461; 370/332–333
See application file for complete search history.

(56) References Cited

U.S. PATENT DOCUMENTS 6,363,260 B1 * 3/2002 Achour et al. ........... 455/553.1
2001/0044305 A1 * 11/2001 Reddy et al. ............ 455/436
2003/0217174 A1 * 11/2003 Dorenbosch et al. ...... 709/237
2004/0030791 A1 * 2/2004 Dorenbosch et al. ...... 709/230
2004/0102193 A1 * 5/2004 Kitami et al. ........... 455/552.1
2004/0266426 A1 * 12/2004 Marsh et al. ............ 455/426.2
2005/0135335 A1 * 6/2005 Hession et al. ........... 370/352
2005/0136925 A1 * 6/2005 Yamauchi .............. 455/435.1

* cited by examiner

Primary Examiner—Charles Appiah
Assistant Examiner—Olivia Marsh
(74) Attorney, Agent, or Firm—Frank J. Pogacz; Kevin D. Wills (57) ABSTRACT

Fast call set-up for a call to a multi-mode communication unit (102) is facilitated by a method and apparatus for registering and re-registering priorities with a SIP registrar (111). A list of contacts with first priorities associated with a mode of operation in a first enterprise network (106) is established and used. A switch to second priorities is made when a probability of a switch from the first mode of operation to a second mode of operation in a second cellular network (108) satisfies a threshold. The list of contacts includes a contact having an expiration time for the first mode of operation. A quality factor is determined and the list of contacts is re-registered and the expiration time changed if the quality factor does not satisfy a threshold.

3 Claims, 7 Drawing Sheets

FAST CALL SET-UP FOR MULTI-MODE COMMUNICATION

FIELD OF THE INVENTION

The present invention relates in general to wireless communication units and wireless networks, and more specifically to a method and apparatus for reducing a call set-up time for multi-mode wireless communication units.

BACKGROUND OF THE INVENTION

Loosely coupled Wireless Local Area Networks (WLAN) supported by WLAN servers, such as enterprise servers or the like, in addition to providing a user with such amenities as high-speed wireless Internet access to an expanding universe of services can provide an inexpensive alternative for telephony services as well as other real-time applications. A user can carry a wireless device such as a subscriber unit, which may also be referred to interchangeably from time to time herein as a communication unit, or a multi-mode communication unit with multi-use, such as dual-use, capability. Accordingly, the multi-mode communication unit can provide voice communication over an enterprise WLAN server when the multi-mode communication unit is in a WLAN and over a cellular wide area network (WAN or cellular network) such as GSM or 3G when the multi-mode communication unit is outside of the WLAN or leaving the WLAN. As noted, additional networks requiring additional modes of operation may also be present.

When the multi-mode communication unit is linked or otherwise connected through a wireless link or connection to a first network, such as during a call or other communication over the first network, and is moving within range of a second network such as, for example, from a WLAN to a cellular network, a handover of the call, and thus the link or connection, from the first network to the second network is desirable. Handovers are preferably conducted with minimal undesirable effects, service degradation, or service interruption. Since preparation for making a connection to a new network may take a relatively long time on the order of, say 10 s, for example to bring up software and hardware necessary to operate within and register with the new system, a user can experience unsatisfactory service or, worse, a dropped call or link. Conversely, maintaining registration and communication with multiple systems at all times can seriously reduce battery life for the multi-mode communication unit, and may create problems associated with the management of an excessive number of registrations for multi-mode communication units which may not be connected with a particular service. Thus maintaining registration with more than one network when it is not necessary is impractical and inefficient.

As will be appreciated, a main target market for multi-mode equipment is the large enterprise. Employees using multi-mode communication units can, for example, use the same phone in the enterprise and in the cellular system. Preferably, the multi-mode communication unit uses the Wireless IP LAN (WLAN) while the employee is inside the enterprise giving significant cost savings for the enterprise. In accordance with various exemplary embodiments, operation of a multi-mode communication unit, in switching between systems, should be transparent to a user. Thus, when a user leaves or enters an enterprise, the multi-mode communication unit should automatically switch modes from WLAN to cellular or vice versa. It should be noted that notwithstanding the need to switch systems or networks, inbound calls addressed to the multi-mode communication unit must reach multi-mode communication unit within a reasonable time regardless of its location.

Therefore, to address the above described problems and other problems, what is needed is a method and apparatus for reducing a call set up time for a call to a multi-mode communication unit associated with switching between modes, such as the time associated with setting up a new connection to a multi-mode communication unit during or after switching between wireless communications networks such as a WLAN and a cellular network.

BRIEF DESCRIPTION OF THE DRAWINGS

The accompanying figures, where like reference numerals refer to identical or functionally similar elements and which together with the detailed description below are incorporated in and form part of the specification, serve to further illustrate a preferred embodiment and to explain various principles and advantages in accordance with the present invention.

DETAILED DESCRIPTION OF THE PREFERRED EMBODIMENTS

In overview, the present disclosure concerns wireless communications devices or units, often referred to as communication units, such as cellular phone or two-way radios and the like having multi-mode operating capability, such as a dual mode capability understood as the ability to operate in accordance with two, or in some cases more, operating modes such as an enterprise mode and a cellular mode associated with a communication system such as an Enterprise Network, a cellular Radio Access Network, or the like.

Such communication systems may further provide services such as voice and data communications services to multi-mode communication units. More particularly, various inventive concepts and principles are embodied in systems, multi-mode communication units, and methods therein for reducing a call set up time associated with a call to a multi-mode communication unit. It should be noted that the term communication unit or multi-mode communication unit may be used interchangeably herein with subscriber unit, wireless subscriber unit, wireless subscriber device or the like. Each of these terms denotes a device ordinarily associated with a user and typically a wireless mobile device that may be used with a public network in accordance with a service agreement or within a private network such as an enterprise network. Examples of such units include personal digital assistants, personal assignment pads, and personal computers equipped for wireless operation, a cellular handset or device, or equivalents thereof provided such units are arranged and constructed for operation in different networks.

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions.

Much of the inventive functionality and many of the inventive principles when implemented, are best supported with or in software or integrated circuits (ICs), such as a digital signal processor and software therefore or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the preferred embodiments.

The communication systems and communication units of particular interest are those providing or facilitating voice communications services or data or messaging services over cellular wide area networks (WANs), such as conventional two way systems and devices, various cellular phone systems including analog and digital cellular, CDMA (code division multiple access) and variants thereof, GSM, GPRS (General Packet Radio System), 2.5G and 3G systems such as UMTS (Universal Mobile Telecommunication Service) systems, Internet Protocol (IP) Wireless Wide Area Networks like 802.16, 802.20 or Flarion, integrated digital enhanced networks and variants or evolutions thereof. Furthermore the wireless communication units or devices of interest have short range wireless communications capability normally referred to as WLAN capabilities, such as IEEE 802.11, Bluetooth, or Hiper-Lan and the like preferably using CDMA, frequency hopping, OFDM or TDMA access technologies and one or more of various networking protocols, such as TCP/IP (Transmission Control Protocol/Internet Protocol), UDP/UP (Universal Datagram Protocol/Universal Protocol), IPX/SPX (Inter-Packet Exchange/Sequential Packet Exchange), Net BIOS (Network Basic Input Output System) or other protocol structures. Alternatively the wireless communication units or devices of interest may be connected to a LAN using protocols such as TCP/IP, UDP/UP, IPX/SPX, or Net BIOS via a hardwired interface such as a cable and/or a connector.

As further discussed herein below, various inventive principles and combinations thereof are advantageously employed to reduce a call setup time during mode switching associated with a multi-mode communication unit. A first list of contacts having respective priorities for a first mode of operation, such as an enterprise mode or the like, as would be typically associated with the multi-mode communication unit may be established or otherwise registered with, for example, a controller such as a network controller, Session Initiation Protocol (SIP) registrar, SIP proxy or server, enterprise server, enterprise PBX, or the like preferably with wireless interface capabilities and capabilities to connect and control calls or sessions through a Public Switched Telephone System (PSTN). The first list is normally established or registered when the multi-mode communication unit starts to operate according to the first mode of operation, for example when it powers up in a system supporting the first mode of operation or when it roams into such a system and begins operations there.

The list of contacts may be modified with respective priorities for a second mode of operation associated with the multi-mode communication unit and the modified list may be registered or re-registered. It will be appreciated by one of ordinary skill in the art that the list of contacts with the first respective priorities may be used when the multi-mode communication unit is operating in accordance with a first mode of operation. The modified list of contacts with the modified priorities may be registered when a switch from operation out of the first network and into another, such as the second network appears imminent. The modified list may thus be used for contact with the multi-mode communication unit prior to, during, and after when the transition, mode switch, or the like, from operation in accordance with the first mode of operation to operation in accordance with a second mode of operation takes place. It will be appreciated that determination of the impending transition from the first mode to the second may occur prior to the actual mode switch by detecting deteriorating signal quality, detecting a border cell, or the like which suggest the likelihood of an impending mode switch. Accordingly the registered contacts may be used after the determination and prior to, during, or after the mode switch in accordance with various exemplary embodiments. It will also be appreciated that a probability associated with the impending mode switch may be more clearly expressed as the probability of a mode switch within an amount of time such as within the next 10 seconds and may be determined in a manner to be described in greater detail. In addition to determining a probability of a mode switch, a simpler method such as the detection of a beacon signal or other special indication associated with a border cell or border cells placed at various locations along a service boundary of a service area associated with the first mode may be used to signal an impending mode switch without the explicit calculation of a probability.

Further in accordance with exemplary embodiments, call setup time during and after mode switching associated with a multi-mode communication unit may be reduced by establishing or otherwise registering a list of contacts with respective priorities associated with a first mode of operation of the multi-mode communication unit. The priorities may be used when the multi-mode communication unit is operating in accordance with the first mode of operation, such as an enterprise mode, WLAN mode or the like. A second set of priorities associated with the list of contacts may be used when a switch from operation in accordance with the first mode of operation to operation in accordance with a second mode of operation, such as a switch between the enterprise mode and a cellular mode, is determined to be imminent.

Figure 1:
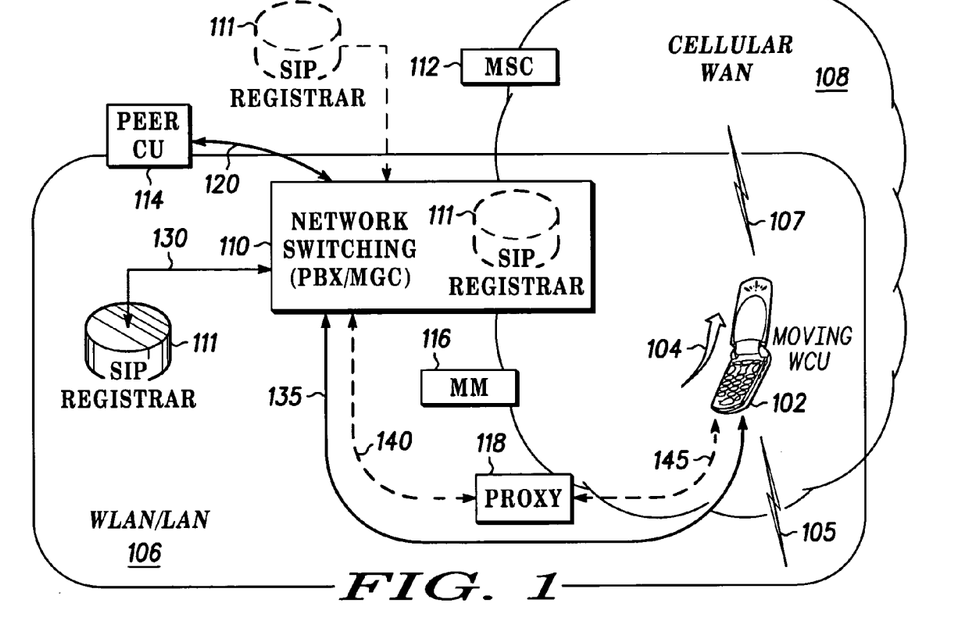
FIG. 1 is a diagram illustrating a simplified and representative environment associated with an exemplary multi-mode communication unit and exemplary wireless networks in accordance with various exemplary embodiments.

Referring now to FIG. 1, a simplified and representative exemplary scenario associated with reduction of call set up time will be discussed and described. In accordance with various exemplary embodiments, multi-mode communication unit 102 is movable 104 between service from a first wireless communications network 106 (hereinafter "first network 106") and service from a second wireless communications network 108 (hereinafter "second network 108"). An exemplary arrangement in accordance with various exemplary embodiments, better facilitates mobility by using a Session Initiation Protocol (SIP) for managing session initiation such as, for example, call setup. SIP is more fully described in Internet Engineering Task Force (IETF) Request For Comments (RFC) 3261, available at www.ietf.org/rfc.html. In addition to providing mobility, use of SIP improves availability of a single- or multi-mode communication unit by allowing multiple contacts such as addresses, telephone numbers, locations or the like, for the communication unit to be registered or otherwise specified at a SIP registration entity, such as SIP registrar 111. While the primary placement of SIP registrar 111 is shown within first network 106, it will be appreciated that SIP registrar may be located within network switching function 110, within the second network 108, or outside first network 106 and second network 108. It should be noted that SIP registrar 111 is preferably a server configured to accepts REGISTER requests for contact information that multi-mode communication unit 102 or an entity associated therewith such as a Home Location Register (HLR) wishes to be known. The information is placed into the location service for SIP registrar 111's domain.

As noted, a set of contacts represent where multi-mode communication unit 102 can be reached such that an incoming call can be quickly routed. For example, one contact can have an address such as a mobile telephone number, an Internet address or the like for providing contact with the multi-mode communication unit at the WLAN and another contact can have an address such as a mobile telephone number, Internet address, Universal Resource Identifier (URI), or the like for providing contact with the multi-mode communication unit within the cellular network. One or more additional contacts can be added to route the incoming call to a service such as a pager, email, voice mail, or the like, if higher priority contacts fail to result in a successful contact. It will further be appreciated that the incoming call may be part of a forwarded call from outside the WLAN and cellular environment. Different contacts registered, for example, in SIP Registrar 111 or otherwise specified, may further have different priorities or q-values such that each contact will be tried in a well defined order. It will further be appreciated that while the mere use of different q-values is not uncommon within the SIP environment, the particular techniques used for multi-mode communication units described in further detail herein below go beyond conventional SIP implementations. According to an exemplary call set-up in the SIP environment, contact addresses are tried in an order of decreasing q-value. Only after a contact attempt fails to reach multi-mode communication unit 102 on a contact with a higher priority, are any lower priority contacts tried. Contacts are tried until the call set-up attempt succeeds on one of the contacts or until the call set-up attempt fails completely.

First network 106 includes a network switching function 110 alternatively referred to as Private Branch Exchange (PBX), enterprise server, media gateway controller (MGC), IP-PBX, and so on. The WAN or second network 108 also includes a network switching function, alternatively referred to as a mobile switching center or MSC 112. The coverage area of second network 108 is typically much larger than that of first network 106 and may overlap in total or in part the coverage area of first network 106 as depicted. Note that although the terms first and second networks are used in an exemplary fashion throughout the description the terms may be interchanged, e.g. first network 106 could be a WAN and second network 108 a WLAN, or both could be WLANs or WANs for example. It will also be appreciated that entities or functions associated with typical networks are not specifically shown but understood to be present and operational. For example first network 106, may use a large number of Access Points, not shown, to support a radio or wireless link with multi-mode communication unit 102. Further, typical network routing equipment such as servers, concentrators, routers, are not shown but assumed to be present where appropriate as would be appreciated by one of ordinary skill in the art. Similarly, second network 108 or wireless WAN (hereafter WAN) typically includes a plurality of base transmitters, antenna towers, and base site controllers all serving to provide a radio access network for communication units as well as various registrars, billing servers and so forth, all of which are not shown. It will be appreciated that wireless signals 105 and 107 represent signal coverage between multi-mode communication unit 102 and first network 106 and second network 108 respectively.

While first and second networks 106, 108 are referred to herein as wireless networks, portions of these networks or respective elements thereof may be interconnected or coupled using terrestrial based media such as optical fiber or wires. For example, the switching functions 110 and 112 may be coupled to a wider balance of respective network components or nodes using ordinary cables or wires. Furthermore first network 106 can include and support voice services for stationary or static communications units also capable of being coupled to the network using conventional cabling or wires. Thus the discussions below will refer alternatively to the first network 106 as a WLAN or LAN.

Both first and second networks 106 and 108, via the network switching functions 110 and 112, can likely be interconnected to or via a public switched telephone and data network and, in a preferred embodiment, are packet data networks using packet switched methodologies, and thus coupled to each other. First and second networks 106 and 108 preferably use an exemplary protocol for setting up sessions or connections with other units. Various known protocols can be used, such as H.323 defined and promulgated by the International Multimedia Telecommunication Consortium (IMTC) (see http://www.imtc.org/h323.htm and associated websites for descriptive documents) or Session Initiation Protocol (SIP) defined, as noted above, by the Internet Engineering Task Force (IETF) in RFC3261 document. Much of the discussion below, where relevant, will assume that SIP and SIP constructs and entities are being utilized in the WLAN and that legacy cellular or dispatch protocols are being utilized in the WAN, where it is understood that similar functions and methods are available using other protocols if desired.

The network switching function 110 may serve a single enterprise location, such as an office building or may serve multiple enterprise sites, possibly located in different cities. The network switching function 110 or enterprise server may serve a WLAN hotspot such as a wireless access point (AP) or the like, or multiple WLAN hotspots. It may also serve one or more WLAN coverage areas in private homes that may be connected to the network switching function 110 by such means as IP broadband connections. Moreover, the network switching function 110 can be located at many different locations, such as inside an enterprise, within a broadband operator's premises, or at a Centrex location shared by multiple enterprises, hotspots and/or homes. Generally, network switching function 110 operates to establish a connection or to set up a call such as connection 120–135 between wireless communication units within the WLAN, such as multi-mode communication unit 102 and peer communication units, such as peer communication unit 114. Communication from multi-mode communication unit 102 is preferably according to packet data type communication and communication from peer communication unit 114 will depend on its particular nature. For example, if peer communication unit 114 is another static or wireless communication unit within the WLAN or LAN, or first network 106, communication may proceed according to packet data communications, while if peer communication unit 114 is an ordinary phone outside the LAN or WLAN, or first network 106, a circuit switched connection is likely to be the mode of communication.

Other network entities specifically depicted include mobility manager 116 and an optional proxy server 118. Mobility manager 116 operates to facilitate handover activities, for example, from first network 106 to second network 108, or vice versa, when required. Proxy server 1118, as will be understood to those of ordinary skill in the art, if present, generally provides a central point of contact for communication units to contact when a call set up or other connection is desired with or by a WLAN communication unit. Proxy server 118 will have the most up to date location information, such as addresses for communication units within its purview, and can provide an intermediary function for network switching function 110 in accordance with known techniques. It should be noted that functions associated with proxy server 118 can be combined with mobility manager 116, or each can be a stand-alone entity. Alternatively, functionality associated with proxy server 118 and mobility manager 116 may be combined with network switching function 110. For reasons that will be become apparent, it may be advantageous to combine mobility manager 116 and proxy server 118. It will be appreciated that any combination of the functionality of mobility manager 116 and proxy server 118 can be implemented as incremental software programs operating or executing on the same network based computing platform as proxy server 118.

To better illustrate call set up in accordance with various exemplary embodiments, a session initiation by peer communication unit 114 to, for example, multi-mode communication unit 102 is shown. In one embodiment the signaling portion of the communication including setup, control, and teardown, is preferably done using SIP messaging while the bearer or content path 120–135 includes voice or data carried using VoIP (voice over IP) techniques and real time protocol (RTP) and User Datagram Protocol (UDP). It will be assumed for illustrative purposes that at a time of power up of peer communication unit 114, a first list of contacts has been registered by multi-mode communication unit 102, for example, with SIP registrar 111 according to descending priorities as noted herein above and that the contact associated with first network 106, or the WLAN is preferably the address or contact number associated with the highest priority contact registered with SIP registrar 111 for contacting multi-mode communication unit 102.

When peer communication unit 114 sets up a call or initiates a session with multi-mode communication unit 102, the call is directed to a SIP Universal Resource Identifier (URI) associated with multi-mode communication unit 102. Alternatively, peer communication unit 114 may direct its call to a phone number of the multi-mode communication unit 102 which is configured to terminate at network switching function 110, or which is forwarded or transferred to switching function 110 by the PSTN or switching function 112 of second network 108. A call setup request will consequently be routed over path 120 to network switching function 110 using well-known PSTN or SIP routing methods. To determine further routing information for the call setup request, network switching function 110 will issue a query to SIP registrar 111 associated with the call set-up target, such as multi-mode communication unit 102, using path 130 to obtain the current list of one or more contacts for multi-mode communication unit 102. Since multi-mode communication unit 102 is in first network 106 or the WLAN-mode, the highest-priority contact in the list will preferably indicate the IP address, number or the like on which multi-mode communication unit 102 can be reached within the WLAN, possibly indicating that multi-mode communication unit 102 shall be reached via the optional proxy 118. Switching function 110 will then forward a call setup request, typically in the form of a SIP INVITE message, to multi-mode communication unit 102 via WLAN path 135 using, for example, wireless connection 105. It should be noted that if optional proxy 118 is being used, the call setup request can be forwarded via proxy 118, using paths 140 and 145, where path 145 uses wireless connection 105 and path 140 extends from proxy server 118 to network switching function 110. In accordance with various alternative exemplary embodiments, SIP registrar 111 can process call setup routing using registered contacts to forward the call setup request to multi-mode communication unit 102 according to the highest priority contact.

After successful session initiation, the content or bearer portion of the communication preferably uses path 135 forming a connection between multi-mode communication unit 102 and network switching function 110 and path 120 to peer communication unit 114. Note that if peer communication unit 114 is within first network 106, the content path would not require network switching function 110 once the communication is set up and content can flow directly between multi-mode communication unit 102 and peer communication unit 114.

Figure 2:
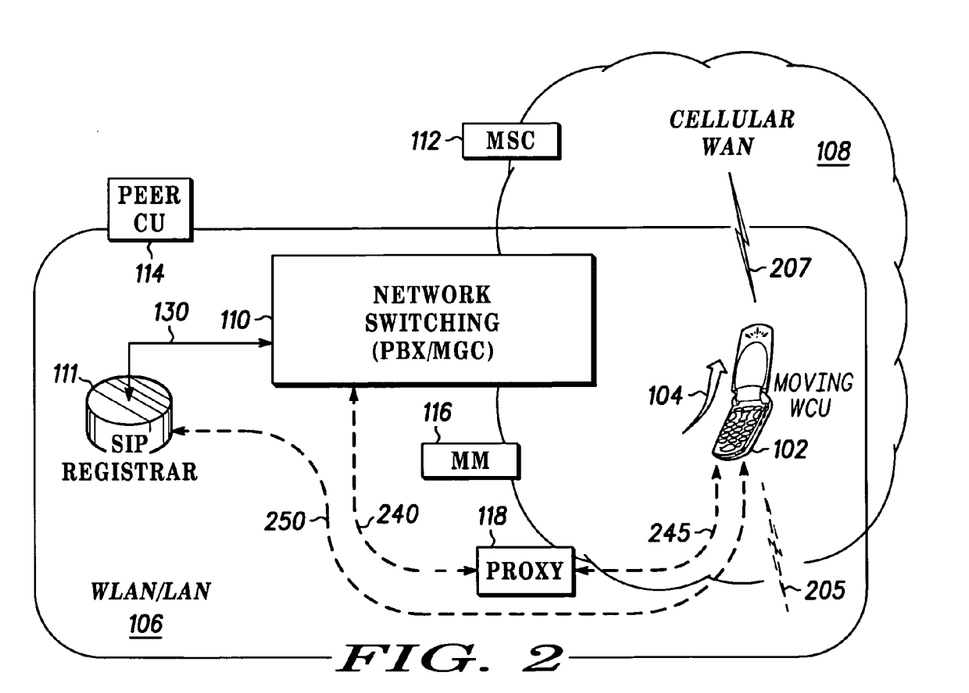
FIG. 2 is a diagram illustrating an exemplary multi-mode communication unit and exemplary wireless networks arranged for the routing of a communications link to the appropriate one of two wireless communications networks in accordance with various exemplary embodiments.
Figure 3:
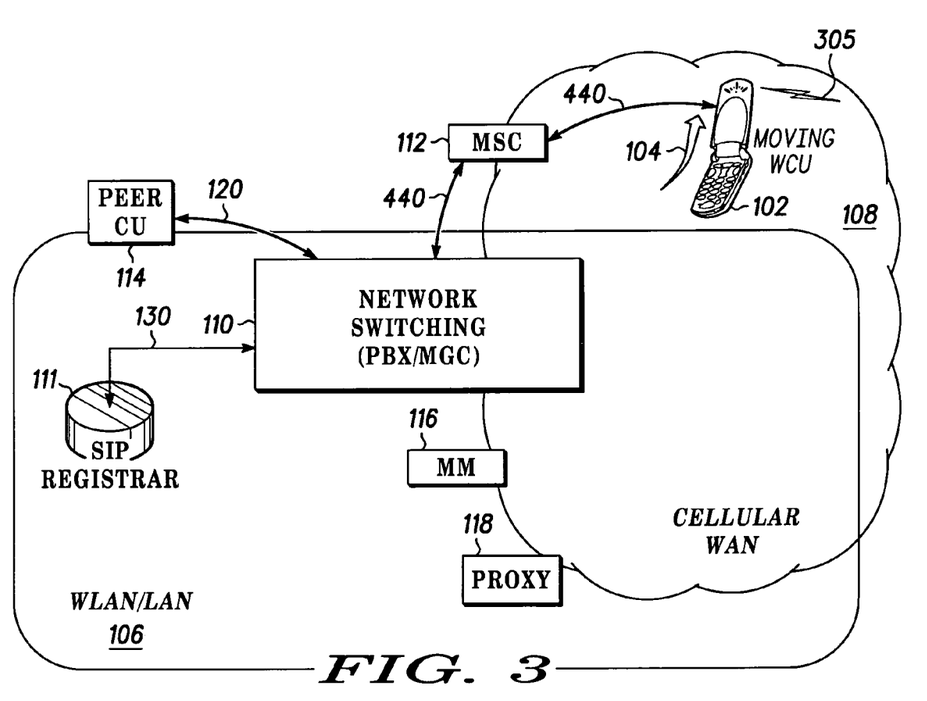
FIG. 3 is a diagram illustrating an exemplary multi-mode communication unit and exemplary wireless networks arranged after a mode switch to a second wireless communications network in accordance with various exemplary embodiments.
Figure 4:
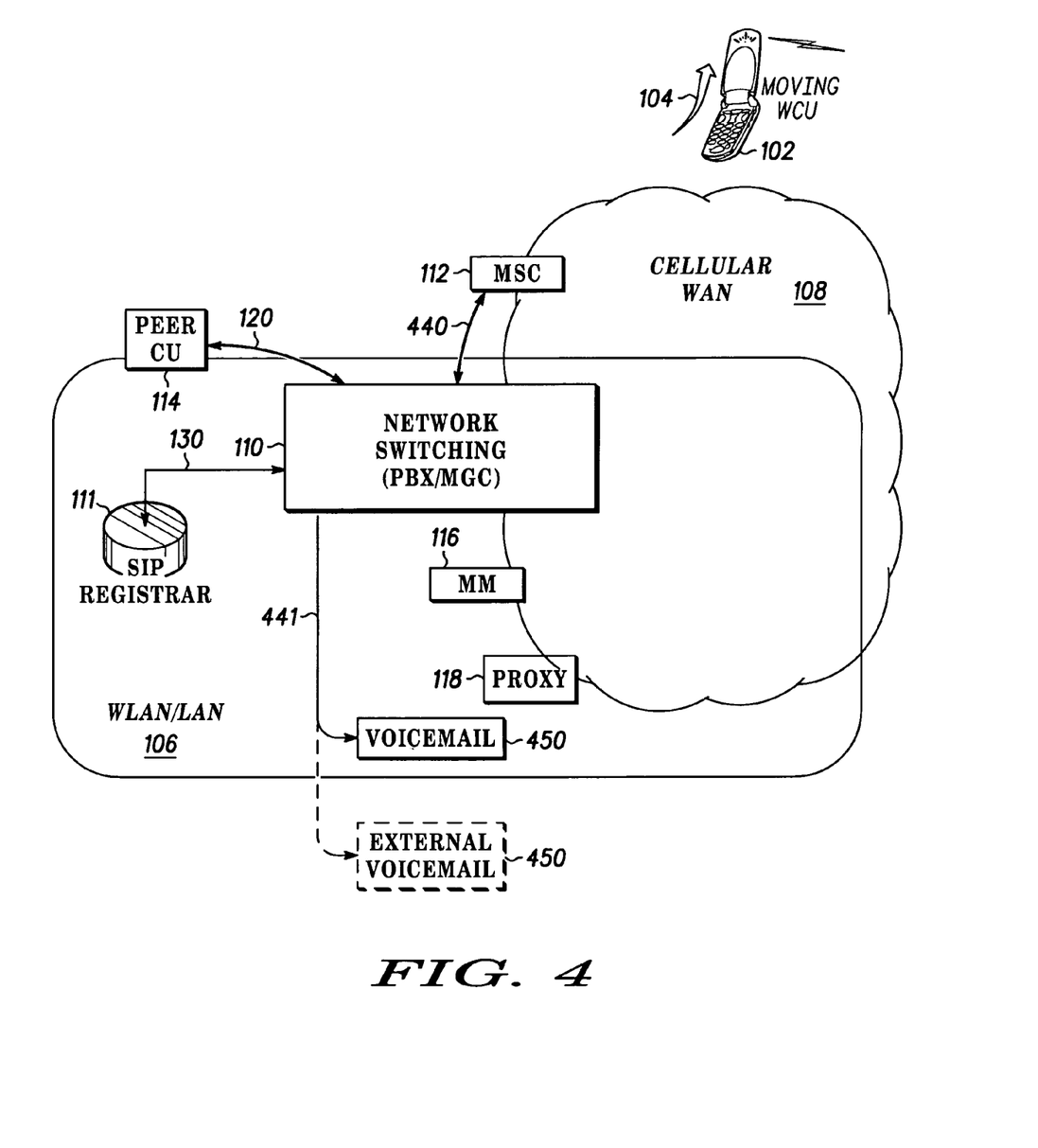
FIG. 4 is a diagram illustrating an exemplary multi-mode communication unit arranged outside the range of wireless communications networks in accordance with various exemplary embodiments.

Referring to FIG. 2, FIG. 3, and FIG. 4, where like reference numerals refer to like entities, various exemplary states associated with movement and re-registration will be discussed.

Initially with reference to FIG. 2, multi-mode communication unit 102 has moved closer to the edge of the WLAN or LAN, or first network 106, for example, indicated by a weakening of the strength of signal 205 associated with the first network and a increasing or constant strength of signal 207 associated with second network 108. It will be appreciated that as part of the operation of multi-mode communication unit 102, a quality factor or metric such as signal to noise ratio, Received Signal Strength Indicator RSSI, or the like, may be measured and monitored. Also, the detection of a border cell associated with, for example, first network 106, and having a beacon or other signal indicator may provide a warning to multi-mode communication unit 102 that the "edge" of the network has been reached. As multi-mode communication unit 102 moves closer to the boundary of first network 106 it will be determined with high probability that mode switching into second network 108 may be imminent or impending. As the result of this determination, preparation must begin for a re-registration and a mode switch and possibly a handout for an ongoing call. It will be appreciated that determination of the probability of an imminent mode switch can be performed by multi-mode wireless communication unit 102 or another entity such as proxy server 118, network switching function 110, Mobility Manager 116, or one of the network entities understood to be present, by assessing connection quality in the first network using the quality metric or quality factor described above or a combination of methods including the rate at which the signal quality is deteriorating and a comparison with the connection quality of the wireless connection 107 of second network 108.

Generally, if the WLAN connection quality level as measured by signal to noise ratio, frame error rate, fraction of missed ping messages or other missed messages or responses from multi-mode communication unit 102, or like assessment, crosses a threshold, a handover or mode switch is likely. In accordance with some exemplary embodiments, multi-mode communication unit 102 can use a hard-wired connection to a LAN, or second network 108. Thus, detection of an imminent or impending mode switch, e.g. from first network 106 into second network 108 may include detecting that the user has removed the connection, or selected an 'eject' function, for example by pushing an eject button or by selecting an eject or disconnect option from, say, a docking port, cradle, or the like, via a user interface associated with multi-mode communication unit 102. It will be appreciated that re-registration with a modified list of contacts, such as with different priorities and expiration times, affects the way future call setup attempts will be handled. The contact list can be modified by adding or removing contacts, by changing priorities of one or more contacts already in the list, and/or by changing expiration times of contacts already in the list. Exemplary modifications of a contact list in accordance with exemplary embodiments are described in detail below. In accordance with a preferred embodiment, re-registration must be done before mode switching or handover occurs.

Re-registration is typically done using a SIP REGISTER message as noted above with regard to initial contact registration. If the determination of increased probability of an imminent mode-switch is performed by multi-mode communication unit 102, the multi-mode communication unit 102 can re-register with SIP registrar 111 over wireless connection 105 and using a direct connection 250, or through proxy server 118 and/or network switching function 110 through connections 240, 245 and 130. It should be noted that the determination of increased probability of an imminent mode-switch can also be performed by proxy server 118, by Mobility Manager 116 or by network switching function 110, in which case the entity responsible for the determination also performs the re-registration on behalf of multi-mode communication unit 102.

Referring to FIG. 3, multi-mode communication unit 102 is shown after a successful re-registration as described above, and after a mode switch to the second wireless communication network 108. It should be noted that the mode switch will typically involve a registration with the second wireless communication network 108, through, for example, MSC 112. If multi-mode communication unit 102 failed to re-register with modified contacts before the mode-switch occurred, it can re-register with SIP registrar 111 through channel 440 to network switching function 110. It will be appreciated that such re-registration is only possible if the second network supports packet data and that, hence, re-registration should preferably done as described above, as the result of the determination while multi-mode communication unit 102 is still in first network 106.

After re-registration, the call setup request from peer communication 114 will again be routed on path 120 to network switching function 110 which again determines how to handle the call setup request by performing a query over path 130 to SIP registrar 111 to obtain contact information. It should be noted that the re-registration shown in FIG. 2 has resulted in a modified contact list such that the contact with the highest priority will be associated with or otherwise "point to" second network 108 using a second network number or second network number address to identify multi-mode communication unit 102. At that point network switching function 110 will forward the call setup request via channel 440 and MSC 112 to multi-mode communication unit 102, using wireless signal 305.

Referring to FIG. 4, a scenario is described where multi-mode communication unit 102 is out of range of both first network 106 and second network 108. As before, a call setup request initiated from peer communication unit 114 may be routed on path 120 through network switching function 110 which determines how to route the call setup request by performing a query over path 130 to SIP registrar 111 to obtain contact information. An attempt to reach multi-mode communication unit 102, for example, in second network 108 will now fail, and call 120 will ultimately be routed to the lowest priority contact in the registry over channel 441 to voicemail 450. It will be appreciated that voicemail 450 may be a voicemail contact inside one of the first and second networks 106, 108 or may be external to both or may alternatively or additionally be a pager, email, or the like (not shown).

Multi-mode communication unit 102, having mobility 104, can move freely within first network 106, or the WLAN or WAN, and may routinely move out of range, e.g. into second network 108, or the WAN, and vice versa. If a call or communication is in progress when movement out of range occurs, a handover, sometimes referred to as handout when the handover is from the WLAN to the WAN, of the ongoing communication from first network 106 to second network 108 is required. However, in accordance with the present invention, the routing of future call set-up requests are of primary interest. Thus, various inventive techniques and an apparatus providing advantages in addressing reduction of call set up time after the determination of an impending mode switch will be the dominant focus of the balance of the present disclosure.

As noted briefly herein above, multi-mode communication unit 102 is programmed or configured such that different q-values or priorities are specified for contacts in a contact list corresponding to different modes of operation, such as a first set of q-values when operating in first network 106 and a second set of q-values when operating in second network 108. To be more specific, the contact list described above contains addresses for likely locations where multi-mode communication unit 102 can be reached such as an address or number for first network 106 and an address or number for second network 108, and perhaps an address or number for an external or internal voicemail contact, pager contact, email contact or the like. Typically an "address" associated with a contact is a URI as described above, and the "number" is an IP address or a telephone number. The priority, or q-value, for each contact will be based on a likelihood that multi-mode communication unit 102 is reachable at that contact at the time of the attempted contact. Thus, for example, when multi-mode communication unit 102 is in first network 106, or the WLAN, the contact associated with first network 106 should have the highest q-value, followed in priority by the contact associated with second network 108, followed by an optional, recommended voice mail contact.

Preferably just before multi-mode communication unit 102 roams out of first network 106 into second network 108, a standard SIP registration, for example, with SIP registrar 111, may be used to change priorities and assign the highest q-value to the contact associated with second network 108. Multi-mode communication unit 102 may optionally remove the contact associated with first network 106, since the validity of the WLAN-assigned IP address associated with the contact for first network 106 may expire. When multi-mode communication unit 102 roams back into first network 106, contacts may be reset using a standard SIP registration as noted above, for example, with SIP registrar 111. It should be noted that SIP re-registrations involving a change in the contact list for a device are generally known. Conventionally, modification of a contact is explicitly done by a device user or by the device as part of a logon session of a user, using parameters defining how the user can be reached at the current location, such as the current IP address used by the device. In more advanced, but known implementations, the device may re-register as a result of a change of attachment point and, for example, modify the IP address in its contact when it attaches to a new location on a network. However, it is important to note that such re-registration procedures are performed after a change in network attachment. In stark contrast, the present invention allows a modification of a contact list before a mode switch between networks. The present invention also allows the modification of the contact list to be triggered by a determination that an imminent mode switch is likely. The present invention still further addresses issues associated with operation at the outer edges of coverage areas where fading in and out of coverage are likely by, for example, allowing for the specification of expiration times and modified expiration times, and multiple address for the same contact as described in greater detail herein below.

Based on the use of registration with multiple contacts having different q-values, network switching function 110, for example, will try to reach multi-mode communication unit 102 in the most likely place first through, for example, a query over 130 sent to SIP registrar 111. If an attempt to reach multi-mode communication unit 102 in the highest q-value location fails, the system will try the next, most likely location. Eventually the call will be routed to the last contact, which is preferably voicemail or the call set-up attempt will time out or the like.

By way of an example, which can be shown with reference to FIG. 1 and FIG. 3, suppose multi-mode communication unit 102 is initially operating in first network 106 with contacts registered with SIP registrar 111 as noted above (FIG. 1). A preferable contact list to be used while operating in the first network contains a highest-priority contact pointing to the address of multi-mode communication unit 102 within first network 106; a lesser priority contact pointing to the number of multi-mode communication unit 102 within second network 108; and a lowest priority contact pointing to the voice mail of multi-mode communication unit 102. Suppose now that the multi-mode communication unit 102 moves out of first network 106 without re-registering. Multi-mode communication unit 102 quickly detects the disappearance of signal 105 associated with the WLAN, or first network 106, and makes preparations such as bringing up its cellular stack, which may refer to the protocol stack associated with operation in second network 108, if not already up (FIG. 3) and attaching to second network 108 through the use of signaling messages over wireless connection 107 with switching function 112 of second network 108. Multi-mode communication unit 102 can try to fix the contacts through registration using packet data but this may take time or may even be impossible if second network 108 does not support packet data. If a call is now originated to multi-mode communication unit 102, network switching function 110 will try to call multi-mode communication unit 102 using the contact associated with first network 106 first and the attempt will fail. Network switching function 110 now tries the next contact, e.g. the contact with the next highest q-value, which is the number associated with second network 108 and the call will eventually reach multi-mode communication unit 102. Such a method, while clearly increasing availability, significantly increases call setup time.

While assignment of q-values is standard within SIP, multi-mode communication unit 102 may advantageously switch q-values as a function of moving in and out of first network 106 and second network 108 through re-registration in accordance with various exemplary embodiments. One difficulty in re-registering is timing re-registrations used by multi-mode communication unit 102 to modify the contacts registered with, for example, SIP registrar 111. For example, when multi-mode communication unit 102 is moving out of first network 106, a re-registration is preferable. However, because there is a good chance that multi-mode communication unit 102 will immediately go back into WLAN coverage within first network 106, and possibly out of coverage of second network 108 multi-mode communication unit 102 may become unreachable if re-registration occurs too soon. Call setup time becomes long, because calls will be forwarded to second network 108 before the contact associated with first network 106 is tried. On the other hand, if multi-mode communication unit 102 waits until WLAN coverage drops completely before re-registering, call setup time may also become long until the re-registration—if at all possible—will succeed. Moreover, since second network 108 may not even support packet data, q-values cannot be swapped resulting, again, in a long call setup time.

To address these and other issues multi-mode communication unit 102, while in first network 106, preferably specifies a finite expiration time for the contact associated with first network 106. Under such a scenario, multi-mode communication unit 102 must re-register before the contact expires. If multi-mode communication unit 102 wanders into second network 108 and cannot send a new re-registration, the contact associated with first network 106 will expire and disappear. Before expiration, call setup time would be long, because the contact associated with first network 106 is tried first. After expiration of the contact associated with first network 106, all calls to multi-mode communication unit 102 would be routed directly to the contact associated with second network 108 thereby improving call setup time. Thus, a short expiration time for the contact associated with first network 106 improves call setup times. However, frequent re-registrations required under the present scenario would present a huge system load and limit the battery life of multi-mode communication unit 102. Various exemplary embodiments of the present invention allow the use of a short expiration time when relevant, while reducing the load of re-registrations at all other times. It should also be noted that an expiration time for a contact associated with second network can be set so as to never expire, or can be set to a high value like 4294967295 seconds or about 136 years. With a high value set for the expiration time, the contact associated with second network will remain valid even after, for example, multi-mode communication unit 102 roams into second network 108 and cannot send a new re-registration.

Further in accordance with various exemplary embodiments, multi-mode communication unit 102 specifies an expiration time for the contact associated with first network 106 depending on first network coverage. When such coverage becomes marginal, or when a border cell is detected via the detection of a beacon signal, special indication, or the like as noted herein above, re-registration can be performed and a short expiration time specified for the contact associated with first network 106. At the same time, multi-mode communication unit 102 makes preparations for communication in second network 108, by for example, bringing up the stack associated with second network 108, such as the cellular stack, so that future incoming calls can be received. Multi-mode communication unit 102 then re-registers before expiration of the newly specified expiration time. If coverage has improved or the border cell is no longer detected, multi-mode communication unit 102 re-registers with a relatively longer expiration time. If multi-mode communication unit 102 definitively leaves the coverage area of first network 106, re-registration with the contact associated with second network 108 on top, or as the highest priority or q-value is preferably performed. Such re-registration however, is not mandatory or urgent, since the contact associated with first network 106, will soon expire all by itself. Still further, with regard to priority values and expiration time values, it will be appreciated that a null value, or a failure to specify a priority value or expiration time value may advantageously result in a default value being used. Thus, a failure to provide a setting may, in itself, be an affirmative setting since allowing a default value to be used in certain circumstances may enhance performance in accordance with various exemplary embodiments.

It should be understood that in referring to priorities, q-values, and the like, a relative priority between at least two contacts is also being referred to. For example, a first priority with a 0.9 value and a second priority with a 0.8 value results in a relative priority where the first priority is higher than the second priority. Further, the relative priority can be discussed with reference to a particular contact. In the example above, a relative priority of the first contact is higher than the second contact while a relative priority of the second contact is lower than the first contact and so on. While in some instances it may be convenient to describe a first priority as being lowered or raised, for example relative to a second priority, one of ordinary skill in the art will appreciate that the same result can be achieved by raising or lowering the second priority relative to the first priority, or a combination of both raising or lowering the first priority and lowering or raising the second priority for example to achieve the desired relative priority.

An example of the type of contact list passed during registration associated with good coverage in the WLAN or first network 106 is shown in Table 1.

TABLE 1

| Contact | Priority | Expiration |
|---|---|---|
| LAN contact (IP address in first network 106) | q = 0.9 | 1800 (30 minutes) |
| Cellular contact (cellular phone number in second network 108) | q = 0.8 | 4294967295 (never expires) |
| Voicemail contact | q = 0.1 | 4294967295 |

An example of a contact list, with priorities and expiration times used for re-registration when multi-mode communication unit 102 detects a border cell or waning coverage in first network 106 is shown in Table 2.

TABLE 2

| Contact | Priority | Expiration |
|---|---|---|
| LAN contact | q = 0.9 | 120 (2 minutes) |
| Cellular contact | q = 0.8 | 4294967295 |
| Voicemail contact | q = 0.1 | 4294967295 |

Assuming that multi-mode communication unit 102 looses coverage associated with first network 106, after, for example, 1 minute and enters the coverage area associated with second network 108, the state of the contacts after an additional 1 minute, e.g. after the expiration of the contact associated with first network 106 is shown in Table 3.

TABLE 3

| Contact | Priority | Expiration |
|---|---|---|
| LAN contact |  | EXPIRED |
| Cellular contact | q = 0.8 | 4294967295 |
| Voicemail contact | q = 0.1 | 4294967295 |

It should be noted that the contact expiration time for the contact associated with first network 106 can be made to depend on the quality of the coverage and the 'speed' of multi-mode communication unit 102. As coverage quality goes down or if speed goes up, multi-mode communication unit 102 preferably uses a shorter expiration time for the contact associated with first network 106. Speed as used herein above can be derived from the amount of inertial acceleration as detected through, for example, a gyroscope and/or an accelerometer; a GPS determined speed, the number of access points recently visited, or the rate at which coverage quality changes.

In accordance with various alternative exemplary embodiments, under certain conditions multi-mode communication unit 102 may move back and forth between good, marginal and no coverage in, for example, first network 106 giving rise to frequent re-registration as described herein above. To avoid numerous re-registrations, many of which are to be made from marginal coverage giving rise to a higher expense in terms of transmission power or the like, multi-mode communication unit 102 can add a third contact in the form of a second contact for first network 106 as shown in Table 4.

TABLE 4

| Contact | Priority | Expiration |
|---|---|---|
| LAN contact A (IP address in first network 106) | q = 0.9 | expires 120 |

TABLE 4-continued

| Contact | Priority | Expiration |
| --- | --- | --- |
| Cellular contact (cellular phone number in second network 108) | q = 0.8 | 4294967295 |
| LAN contact B (IP address in first network 106) | q = 0.7 | expires 3600 (1 hour) |
| Voicemail contact | q = 0.1 | 4294967295 |

With contacts arranged as noted in Table 4, if the short-lived contact A for first network 106 expires and multi-mode communication unit 102 does not manage to re-register in time, the system will still find multi-mode communication unit 102 in first network 106 if a call routed to multi-mode communication unit 102 according to the contact associated with second network 108 does not succeed. The above described variation can be called a 'contact sandwich' because the cellular contact is sandwiched between two WLAN contacts. It should be noted that in accordance with relevant protocols, SIP registrar 111 will not accept two equal contact addresses. Accordingly, WLAN contacts A and B must be different but they must still terminate at multi-mode communication unit 102. To overcome such a limitation, first network 106 may uniquely identify multi-mode communication unit 102 using a single or multiple IP addresses for the same unit using the constructs shown in Table 5.

TABLE 5

LAN contact a = default@<IP_address>
LAN contact b = backup@<IP_address>

While SIP registrar 111 does not allow the use of multiple contacts with the same address, it does support the specification of multiple contacts with equal q-values. As per the SIP specification, contacts with equal q-values will preferably be made to ring at the same time and the first contact to pick up will get the call. If neither equal q-valued contact picks up the call, the system will try the contact with the next lower q-value such as voicemail or the like. Simultaneous ringing however has a disadvantage in that it may use resources such as cellular paging to contact, for example, multi-mode communication unit 102, which may not even be in the cellular network. PBX CPU and trunk resources associated, for example, with network switching function 110, may also be unnecessarily burdened because the network switching function 110 must set up a cellular call in second network 108 and a call in the enterprise in first network 106 for each call that is being made to multi-mode communication unit 102. Thus, in accordance with various exemplary embodiments, simultaneous ringing is used in a more dynamic manner as further described herein below.

For normal operation in first network 106, multi-mode communication unit 102 specifies contacts with different q-values for ordered ringing as described above and shown in Table 1. When multi-mode communication unit 102, which may currently be operating in first network 106 or second network 108, detects entry into an area having marginal coverage, or when it detects a border cell, multi-mode communication unit 102 starts preparations such as bringing up a stack associated with second network 108 and re-registers, specifying simultaneous ringing for the contacts associated with first and second network 106, 108 as shown in Table 6.

TABLE 6

| Contact | Priority | Expiration |
| --- | --- | --- |
| LAN contact | q = 0.8 | 1800 (30 minutes) |
| Cellular contact | q = 0.8 | 4294967295 |
| Voicemail contact | q = 0.1 | 4294967295 |

When a call is placed to multi-mode communication unit 102, the system will simultaneously ring the contacts associated with the first and second networks 106 and 108. If possible, multi-mode communication unit 102 will answer the call on first network 106 and if coverage is very bad, it will answer on second network 108. Naturally, if coverage is absent for first network 106, multi-mode communication unit 102 will only receive the call on second network 108. It should be noted that operation as described may rely on, for example, a user interface which can present different ringing options such as providing one ringing indication for calls to multi-mode communication unit 102 on first network 106 and another, ringing indication for calls to multi-mode communication unit 102 on second network 108. Alternatively and preferably, the choice of the network that will be used for the call may be made by the communication unit and may be made in a way that is transparent to the user. In either case, call setup times are short, while, if multi-mode communication unit 102 does not pick up, the call will still be routed to the next-lower priority contact such as voicemail, within a reasonable amount of time. It should also be noted that when multi-mode communication unit 102 returns into good coverage associated with first network 106, or when it no longer detects a border cell, the normal contacts associated with ordered ringing are preferably restored through re-registration, for example, using the list from Table 1. Further, when multi-mode communication unit 102 gets "stuck" in second network 108, without coverage associated with first network 106, it preferably re-registers with a set of contacts normally associated with cellular operation. Such re-registration in a cellular only environment may be accomplished using SIP-over-packet data. It will be appreciated that, alternatively, multi-mode communication unit 102 can also do nothing and wait for the contact associated with first network 106 to expire. It will also be appreciated that various combinations of the above described scenarios may be used without departing from the invention.

Figure 5:
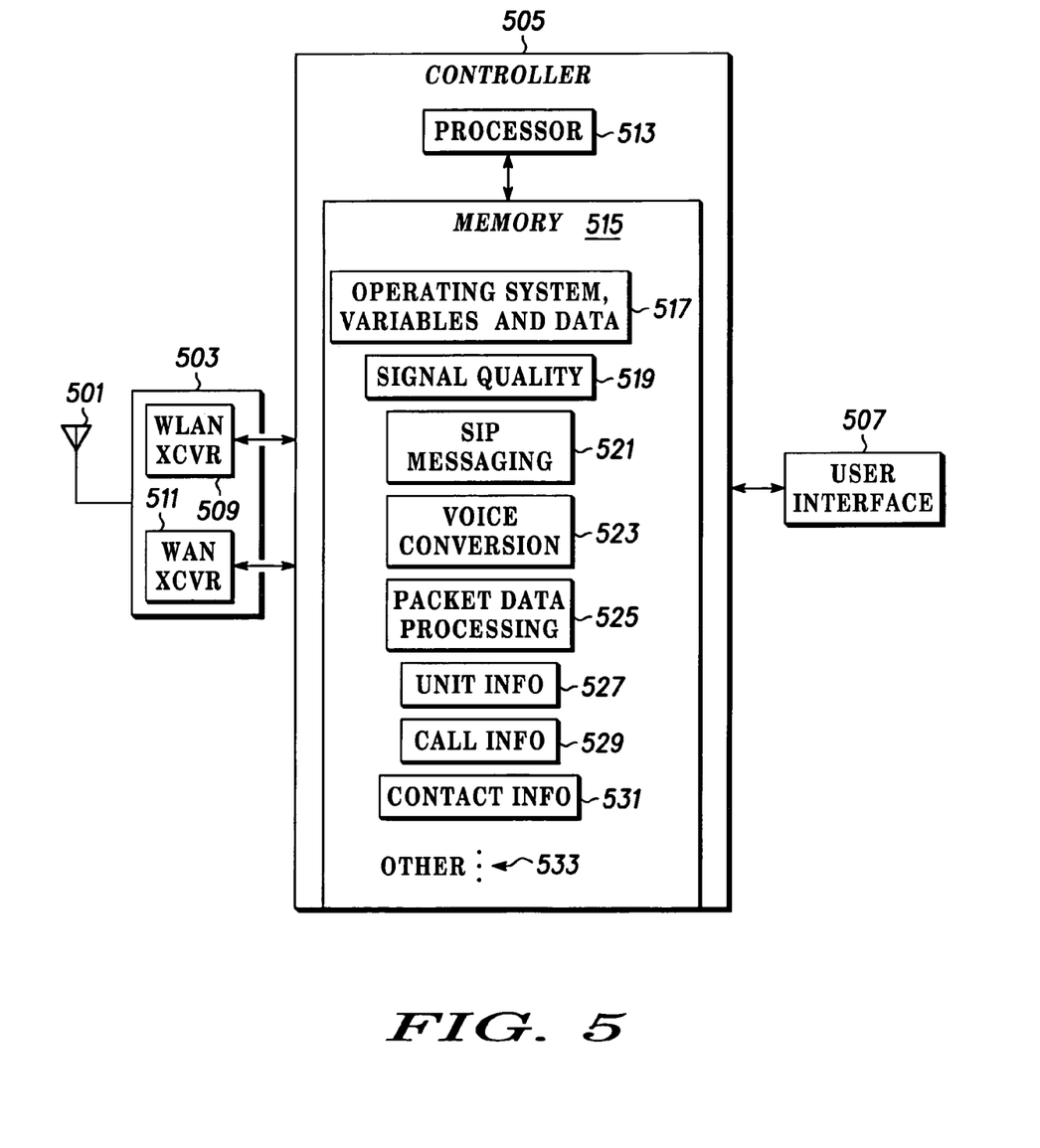
FIG. 5 is a block diagram illustrating portions of an exemplary multi-mode communication unit in accordance with various exemplary embodiments.

Referring to FIG. 5, a simplified block diagram of multi-mode communication unit 102 arranged for reducing call set up time in accordance with various exemplary embodiments will be discussed and described. Multi-mode communication unit 102 is generally known other than the modifications and improvements disclosed herein. Thus the known functions and structure of such devices will not be described in detail other than as related to the inventive principles and concepts disclosed and discussed below. Multi-mode communication unit 102 includes an antenna 501 or antenna structure that operates to couple radio frequency (RF) signals between a transceiver or RF interface 503 and the first or second network 106, 108 as is known. For example, radio signals transmitted from the WLAN, or first network 106 or Wireless WAN 108, such as respectively, by an access point or base transmitter site are absorbed by antenna 501 and coupled to a receiver portion of transceiver 503.

Respectively, signals amplified by and coupled from transceiver 503, specifically a transmitter such as a WLAN transmitter 509 or a WAN transmitter 511, to antenna 501 are radiated or transmitted or sent to the access point or base transmitter site according to known WLAN technologies, such as 802.11 and other technologies described herein above. Transceiver 503 will preferably be configurable to support simultaneous air interfaces with multiple communication networks according to the conventions and protocols of each or may alternatively further include one or more of a WLAN transceiver 509 and WAN transceiver 511 for such purposes as will be appreciated by those of ordinary skill. Transceiver 503 or respective receivers and transmitters are coupled or interconnected as depicted and interactively operate with and are controlled by a controller 505 to provide to, or accept or receive from the controller 505, voice traffic or data messages or signals corresponding thereto in packet data or circuit form. It should be noted that if multi-mode communication unit 102 uses a hardwired interface to connect to the LAN, it will preferably have a network interface function (not shown), similar or equal to, for example, interface 603 (see FIG. 6) described in greater detail herein below.

Accordingly, transceiver 503 as controlled by and in cooperation with the controller 505 and functions thereof provide multi-mode communication unit 102 with multi or dual operating mode capability. More particularly, multi-mode communication unit 102 is capable of registering with and obtaining service from first and second communication networks 106 and 108. For purposes of simplifying this disclosure, the balance of the discussion will refer to only the transceiver 503 and it is understood the transceiver with the controller 505 has the capability to establish and maintain a connection via either of or both the first and the second networks 106, 108.

Controller 505 is coupled to and generally operates in a known manner with a user interface 507 providing, in certain cases, operating indicia such as ringing and the like for each network capable of being connected with. User interface 507 is known and typically includes, for example, audio transducers, such as an earphone or speaker and microphone, a display and a keypad. The transceiver and user interface are each inter coupled, as depicted to the controller 505 and the controller provides overall operational command and control for multi-mode communication unit 102. It should be noted that controller 505 is essentially a general-purpose processor and, preferably, includes processor 513 and associated memory 515. Processor 513 is, preferably, a known processor based element with functionality that will depend on the specifics of the air interfaces with the first and second networks 106 and 108 as well as various network protocols for voice and data traffic. Processor 513 will operate to encode and decode voice and data messages to provide signals suitable for the transceiver, a transducer, or further processing by the controller 505. Processor 513 may include one or more generally available microprocessors, digital signal processors, and other integrated circuits depending on the responsibilities of the controller 505 with respect to signal processing duties or other unit features not here relevant.

Controller 505 also includes memory 515 that may be, for example, a combination of known RAM (Random Access Memory), ROM (Read-Only Memory), EEPROM (Electrically Erasable Programmable ROM) or magnetic memory. Memory 515 is used to store among various other items or programs etc., an operating system or software, data, and variables 517 for execution or use by the processor 513. Operating software 517, when executed by the processor 513, will result in the processor performing the requisite functions of multi-mode communication unit 102 such as interfacing with user interface 507 and transceiver 503 or transmitting and receiving devices. Memory 515 further includes call processing routines not specifically shown for supporting voice and data calls that will be appreciated by one of ordinary skill and that will vary depending on air interface, call processing, and service provider or network specifics.

As depicted, memory 515 further includes, in some embodiments, a signal quality assessment routine 519 for use in determining whether a handover or a mode switch may be required if multi-mode communication unit 102 is responsible for that determination as discussed herein above and to assess signal quality and perform threshold comparison. Depending on the result, signal quality assessment routine 519 may determine the probability that a mode switch or handover situation is imminent and compare that probability with a predetermined threshold. The exact nature of signal quality assessment routine 519 may be communication unit specific and can be experimentally determined and modified as experience dictates. As noted above, signal quality assessment routine 519 may be a signal to noise determination, an RSSI determination, a frame error rate determination, a ping response failure, or other determination resulting in a quality factor. As will be appreciated, the quality factor may be compared against a threshold and, if above or below the threshold, a threshold condition associated with the quality factor will be deemed to exist.

In one embodiment, SIP messaging routines 521 are provided for generating and responding to SIP messages according to known techniques and may be used to support the air interface with first and second communication networks 106 and 108 to initiate and receive calls, register and re-register contacts, and the like. Also depicted is a voice conversion or vocoder routine 523 which may be used in conjunction with other specialized portions of processor 513 to convert voice to digital form and digital voice to a form that can be reproduced in an audio format for use in driving a speaker or earpiece. Additionally, packet data processes 525 are provided for formulating appropriate packets for transport according to the specifics of the communication networks.

As noted above, various data is provided in memory 515, and specifically, unit information 527 may be provided including identification information used to identify multi-mode communication unit 102 such as phone numbers, IP addresses and/or URIs. Call information 529 may also be stored in memory 515 for tracking information associated with calls. Collectively the information stored in memory 515 can be used to identify a particular unit and a particular call, should a mode switch or a handover or handout be required. Contact information 531, as described in detail herein above may also be stored in memory 515 and may be used for SIP registration and re-registration, for example, with SIP registrar 111. Various other routines 533 not especially relevant to the disclosure and that will be obvious to one of ordinary skill given a specific communication unit will not be discussed.

As noted above, in some embodiments, first network 106 is a wireless local area network and second network 108 is a wireless wide area network. Multi-mode communication unit 102, specifically controller 505 operating with transceiver 503 can obtain call information during call setup. If, for example, first network 106 uses SIP messaging for call setup, a Session Initiation Protocol (SIP) INVITE message and a response message to the SIP INVITE message will be exchanged depending on which party initiates call set up.

Figure 6:
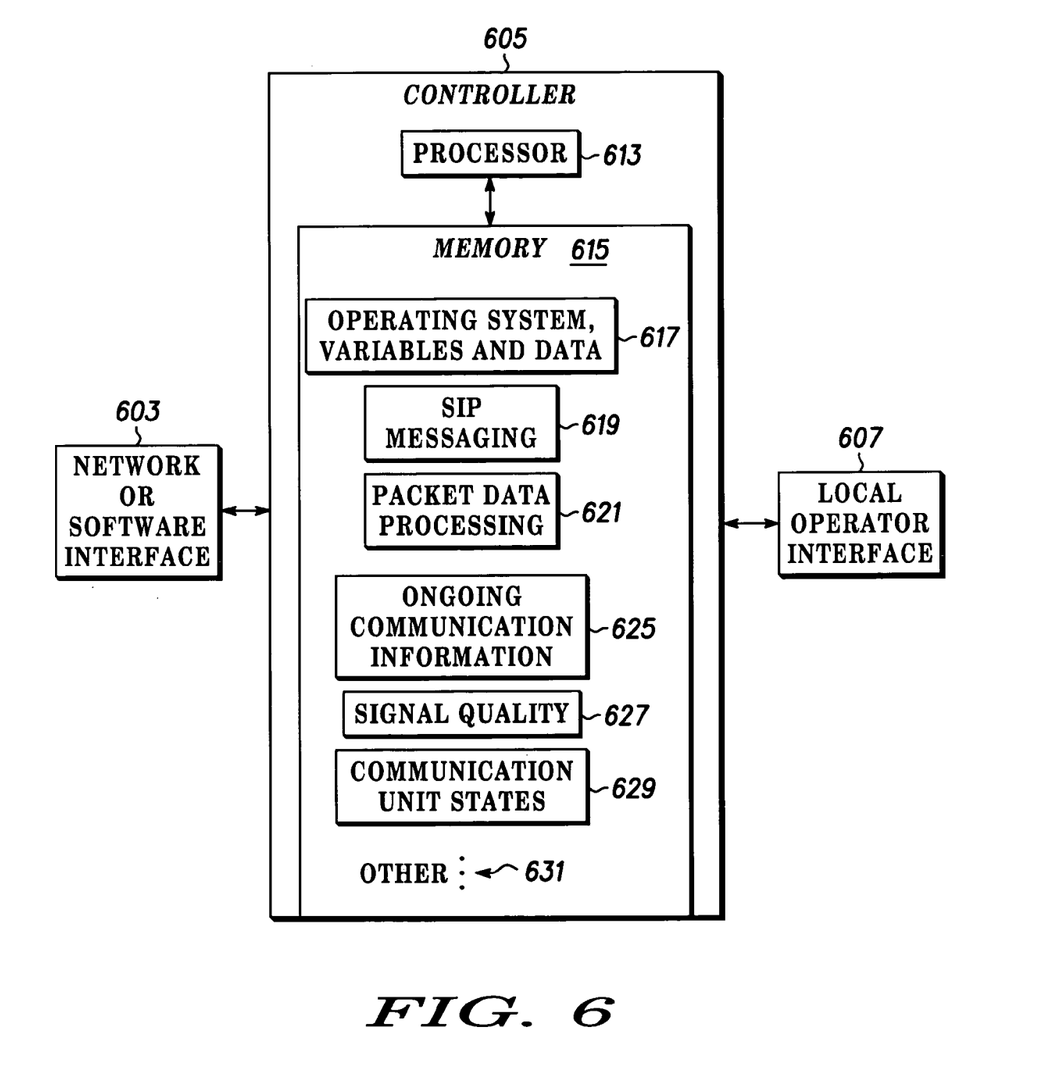
FIG. 6 is a block diagram illustrating portions of an exemplary infrastructure device in accordance with various exemplary embodiments.

Referring to FIG. 6, a simplified block diagram of infrastructure component 605 capable of implementing functions such as network switching function 110 will be discussed. It will be appreciated that in a manner similar to FIG. 5, a general purpose computing platform embodying a stand alone infrastructure component can be viewed as another of various network entities, such as proxy server 118 with emphasis on SIP registration and call set up. Generally, infrastructure component 605 includes an interface 603, specifically a network interface function, such as a network transceiver, RF interface or the like, or a software interface function if infrastructure component 605 is operating on a platform also embodying another network entity. It will be appreciated that network interface 603 can, in accordance with some embodiments, be an RJ-45 physical connector and support an Ethernet protocol, an IP protocol, a cellular protocol and/or a PSTN protocol.

The interface 603 is coupled to and controlled by a controller 605 that can be further coupled to a local or remote operator interface, such as a monitor and keyboard or another computing platform all as known. The controller includes a processor 613 that is a general purpose processor that may be redundant for incremental network availability. The processor is coupled to a memory 615 that will be some combination of RAM, ROM, EEPROM, and likely magnetic based memory as would be expected on such platforms. Note a suitable platform, server, or computer is available from various manufacturers, including IBM, Dell, and Hewlett Packard, for example.

Memory 615 includes an operating system, data, and variables 617 that provide the general operating conditions, etc. for the processor as is known. Memory 615 may also contain contact list information obtained via, for example, a query to SIP registrar 111 for contacts used to route call set ups. In some embodiments SIP messaging routines 619 are included to facilitate forming and decoding messages according to known SIP protocols. Additionally packet data processing routines 621 are provided for supporting packet data communication within the network according to the conventions used by the network. Note as discussed above identification such as caller IDs, called party IDs, Call IDs, and the like are used to distinguish one call from another. Ongoing communication or call information 625 obtained as discussed above for ongoing calls may be stored. If infrastructure component 605 is responsible for determining when a mode switch may be imminent, a signal quality assessment routine 627, operating as noted above will be provided to determine a quality factor or the probability of or need for a switch from operation in accordance with the first mode of operation to operation in accordance with the second mode of operation. As also noted, signal quality assessment routine 627 may be a signal to noise determination, an RSSI determination, a frame error rate determination, a ping response failure, or other determination resulting in a quality factor. As will be appreciated, the quality factor may be compared against a threshold and, if above or below the threshold, a threshold condition associated with the quality factor will be deemed to exist. Furthermore, communication unit states 629 are stored for all communication units being serviced to allow infrastructure component 605 to formulate and respond to SIP messages on behalf of such units. Additionally, many other routines 631 understood by those of ordinary skill may be present though not necessarily relevant.

Figure 7:
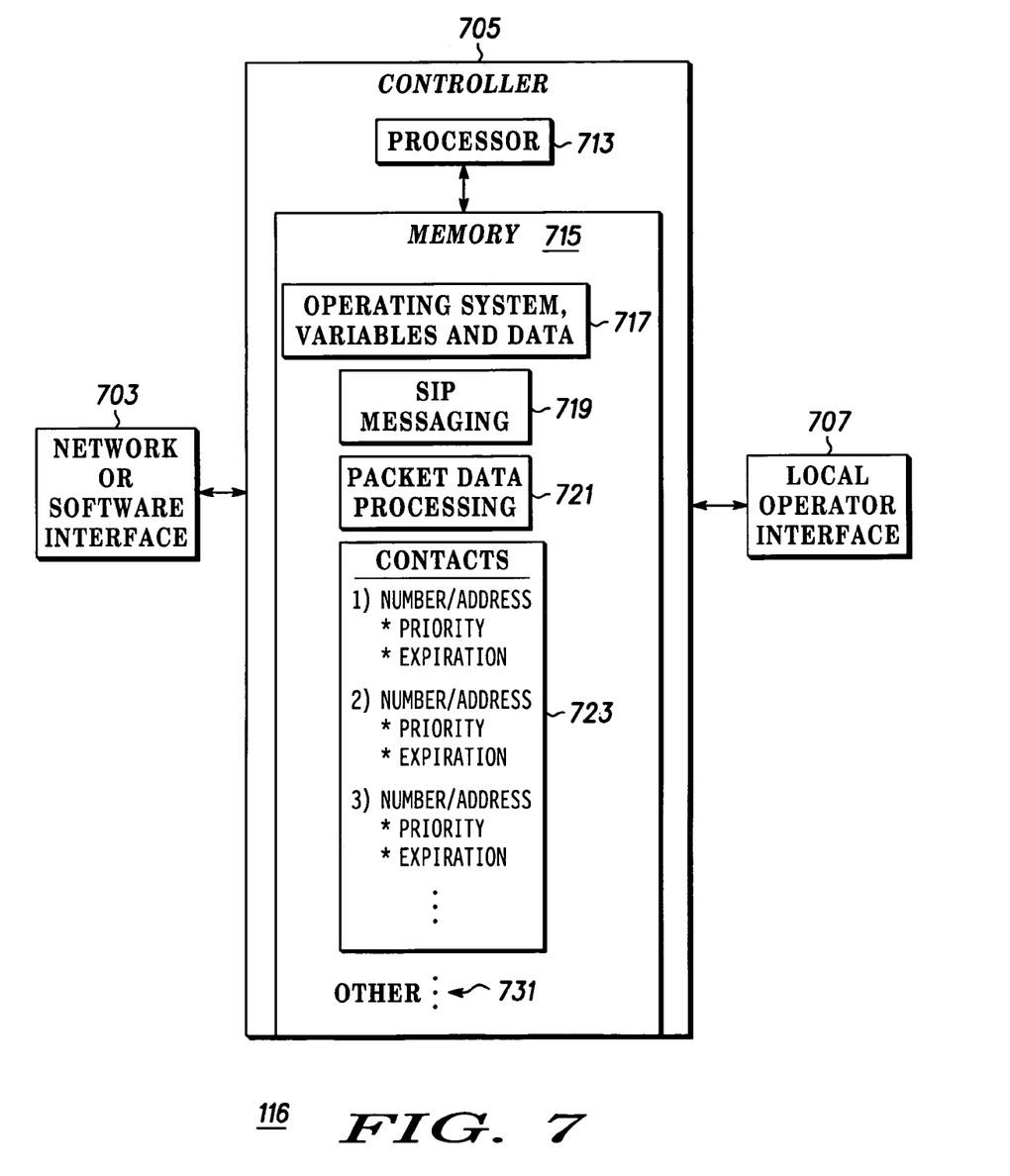
FIG. 7 is a block diagram illustrating portions of an exemplary registrar in accordance with various exemplary embodiments.

Referring to FIG. 7, a simplified block diagram of SIP registrar 705 capable of implementing SIP related functions in conjunction with network entities such as network switching function 110 will be discussed. It will be appreciated that in a manner similar to FIG. 5 and FIG. 6, a general purpose computing platform embodying a stand alone SIP registrar can be viewed as another of various network entities, such as proxy server 118 with emphasis on SIP registration and call set up. Generally, SIP registrar 705 includes an interface 703, specifically a network interface function, such as a network transceiver, RF interface or the like, or a software interface function if SIP registrar 705 is operating on a platform also embodying another network entity, such as the network switching function 110 or a 3G Home Location Register (HLR). It will be appreciated that network interface 703 can, in accordance with some embodiments, be an RJ-45 physical connector and support an Ethernet protocol or another LAN or WAN protocol.

Interface 703 is coupled to and controlled by controller 705 that can be further coupled to a local or remote operator interface 707, such as a monitor and keyboard or another computing platform all as known. The controller includes processor 713 that is a general purpose processor that may be redundant for incremental network availability. Processor 713 is coupled to memory 715 including some combination of RAM, ROM, EEPROM, and likely magnetic based memory as would be expected on such platforms. Memory 715 includes an operating system, data, and variables 717 providing general operating conditions, and the like, for processor 713 as is known. In some embodiments, SIP messaging routines 719 are included to facilitate forming and decoding messages according to known SIP protocols. Additionally packet data processing routines 721 are provided for supporting packet data communication within the network according to the conventions used by the network. Note as discussed above identification such as caller IDs, called party IDs, Call IDs, and the like may be used to distinguish one call from another, if needed. To provide SIP registration functionality in accordance with various exemplary embodiments, contact registry 723 may be used to contain contact information including an address, such as an internet address or telephone number, priority or q-value information, and an expiration time for the contact. According to known SIP protocols, a SIP REGISTER message can be used to enter and modify the contact information 713. The contact information 713 can be queried in various ways including a standard query language message or by using a SIP INVITE message. Additionally, many other routines 731 understood by those of ordinary skill may be present though not necessarily relevant.

Figure 8:
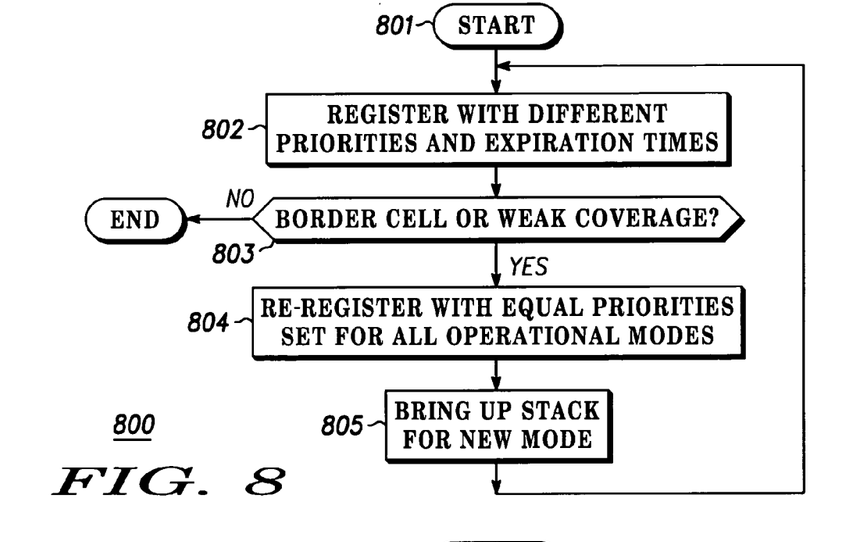
FIG. 8 is a flow chart illustrating an exemplary registration procedure in accordance with various exemplary and alternative exemplary embodiments.

Referring to FIG. 8, a flow chart illustrating an exemplary registration procedure pursuant, for example, to reducing call set up times will be discussed and described. The method of FIG. 8 is advantageously practiced, for example, when multi-mode communication unit 102 is in an area of marginal coverage or detects a border cell as described herein above. After start at 801, multi-mode communication unit 102 registers at 802, for example, with SIP registrar 111, different priorities associated with different contacts capable of providing contact to multi-mode communication unit 102 within first network 106, second network 108, or out of both networks, such as voicemail as described herein above and shown, for example, in Table 1. If, for example, multi-mode communication unit 102 is operating in first network 106, and marginal coverage is detected at 803, priorities may be re-registered at 804 with the priorities for the contact associated with first network 106 and second network 108 set to be equal as noted for example, in Table 6 above and this will result, for example, in simultaneous ringing in both networks. Multi-mode communication unit 102 can provide a separate indication associated with ringing on each network allowing a user to choose the network to pick up on, or, if coverage for one of the networks is sufficiently poor, only the network with coverage will ring through. Once priorities are re-registered with equal values, preparations are made, e.g. the stack can be brought up for second network 108 and the communication unit can attach to the second network 108 in preparation for operation therein at 805. It should be noted that if marginal coverage is not detected at 803, registration of different priorities and expiration times will have been completed and the procedure can end, stop, wait or the like, or alternatively, marginal coverage or border cells can be checked for periodically, e.g. after a predetermined time interval has elapsed. Also, after the new stack is brought up at 805, registration, for example, at 802, can be made with the new network if a mode switch occurs, otherwise, marginal coverage or border cells may be checked for within the existing network and, if marginal coverage or border cells are no longer detected, suggesting, for example, that a mode switch has not occurred or is not imminent, priorities can be reset to original values as described above, or the like (not shown).

Figure 9:
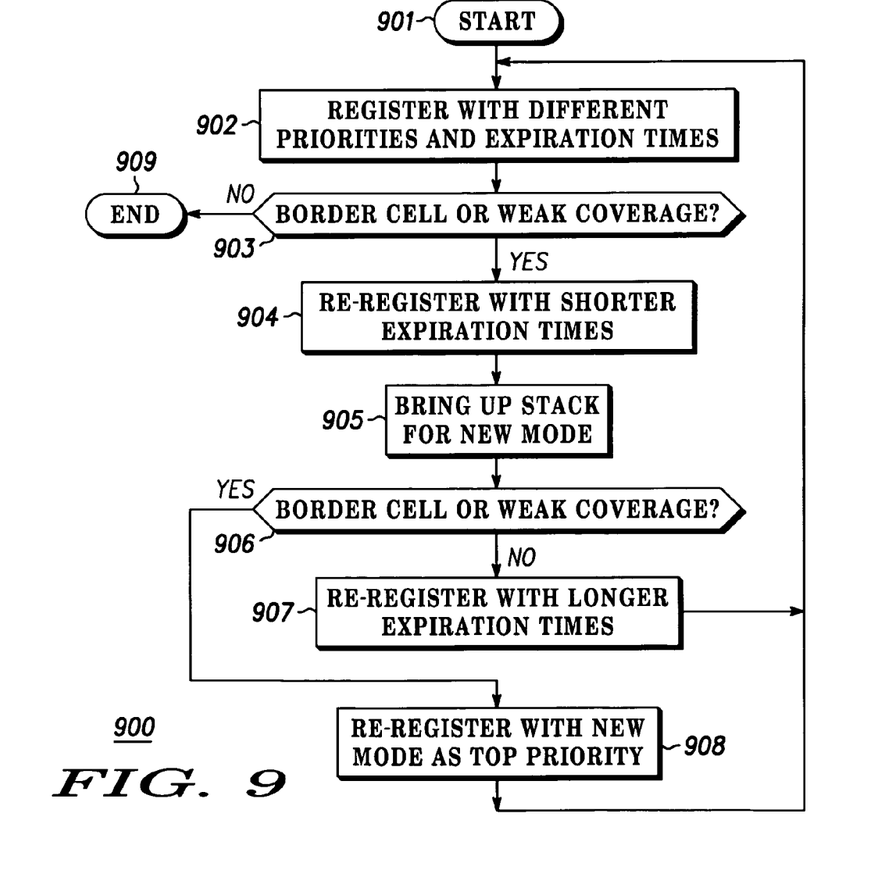
FIG. 9 is a flow chart illustrating another exemplary registration procedure in accordance with various exemplary and alternative exemplary embodiments.

Referring to FIG. 9, a flow chart illustrating another exemplary registration and operation procedure that may be used, for example, in marginal coverage areas or border cells is described. After start at 901, multi-mode communication unit 102 registers at 902, for example, with SIP registrar 111, different priorities associated with different contacts capable of providing contact to multi-mode communication unit 102 within first network 106, second network 108, or out of both networks, such as voicemail as just described, for example, with reference to FIG. 8 above. If, for example, multi-mode communication unit 102 is operating in first network 106, and marginal coverage or a border cell is detected at 903, one or more expiration times may be shortened at 904, for example, for the contact associated with first network 106. This way, if multi-mode communication unit 102 loses coverage in first network 106, the contact will expire more quickly so that contact can be made more quickly in second network 108, which is where multi-mode communication unit 102 will most likely be operating. Also in preparation for losing contact with network 106, the protocol stack for operation in second network 108 may be brought up at 905 or, if already up, multi-mode communication unit 102 may attach to second network 108 by, for example, exchanging messages with the network switching function of the second network 108, like the MSC 112. Coverage may be checked again at 906, for example, prior to expiration of the shorter expiration time associated with the contact for first network 106, and if the first network coverage has strengthened or a border cell is no longer detected, contacts may be re-registered with longer expiration times at 907. If very weak coverage or a border cell is detected at 906, multi-mode communication unit 102 re-registers with the contact associated with second network 108 at the top priority.

It should be noted that the methods and apparatus described above for reduction of call setup time may be implemented in reverse or with different communications networks than those discussed above. For example, the first wireless communications network may be the cellular WAN and second network 108 may be the WLAN. The multi-mode communication unit then operates in WAN and when the communications device detects an action preparatory to making a call over the cellular WAN, registers with and brings up the stack for the WLAN. It should also be noted that the methods of FIG. 8 and FIG. 9 while explained in terms of the various systems and apparatus introduced and discussed above, can as well be practiced by other systems and units provided the concepts and principles described and disclosed can be implemented by such systems and units.

Thus various systems and apparatus have been disclosed and described that implement various principles and concepts that provide for a reduction in call setup times among other advantages.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method for reducing a call setup time in a network for a call setup to a multi-mode communication unit, the method comprising:

registering, when the multi-mode communication unit starts to operate according to a first mode of operation, with a Session Initiation Protocol (SIP) registrar in the network, a list of contacts for the multi-mode communication unit having first respective priorities associated with a first mode of operation of the multi-mode communication unit, the first respective priorities including a first priority of a first contact associated with the first mode of operation and a second priority of a second contact associated with a second mode of operation, wherein the first respective priorities is higher than a second respective priorities;

using the first respective priorities when the multi-mode communication unit is operating in accordance with the first mode of operation; and modifying the list of contacts at the SIP registrar to create a modified list of contacts, with the second respective priorities associated with the second mode of operation of the multi-mode communication unit when a probability of a switch from operation in accordance with the first mode of operation to operation in accordance with the second mode of operation satisfies a threshold, wherein the modified list of contacts having the second respective priorities including the first priority of the first contact associated with the first mode of operation and the second priority of the second contact associated with the second mode of operation, wherein the first respective priorities is not higher than the second respective priorities; wherein the modified list of contacts having the second respective priorities includes the first priority of the first contact associated with the first mode of operation is equal to the second priority of the second contact associated with the second mode of operation.

2. A method for reducing a call setup time in a network for a call setup to a multi-mode communication unit, the call setup conducted in accordance with a protocol, the method comprising:

registering a list of contacts for the multi-mode communication unit with a Session Initiation Protocol (SIP) registrar associated with the protocol in the network, the list of contacts including a first priority of a first contact associated with a first mode of operation and a second priority of a second contact associated with a second mode of operation, wherein the first priority is higher than the second priority, the first contact having a first expiration time;

determining a quality factor associated with the first mode of operation;

re-registering the list of contacts with the SIP registrar, the list of contacts including the first contact having a reduced expiration time if the quality factor does not satisfy a first predetermined quality threshold;

re-determining the quality factor associated with the first mode of operation before the expiration of the first expiration time to provide a second quality factor; and     re-registering the list of contacts, wherein the list of contacts including the first contact having an increased expiration time if the second quality factor exceeds a second predetermined quality threshold.

3. A method for reducing a call setup time in a network for a call setup to a multi-mode communication unit, the call setup conducted in accordance with a protocol, the method comprising:

registering a list of contacts for the multi-mode communication unit with a Session Initiation Protocol (SIP) registrar associated with the protocol in the network, the list of contacts including a first priority of a first contact associated with a first mode of operation and a second priority of a second contact associated with a second mode of operation, wherein the first priority is higher than the second priority, the first contact having a first expiration time;

determining a quality factor associated with the first mode of operation; and     re-registering the list of contacts with the SIP registrar, the list of contacts including the first contact having a reduced expiration time if the quality factor does not satisfy a first predetermined quality threshold, wherein the second contact has a second expiration time according to the second mode of operation of the multi-mode communication unit; and wherein the list of contacts includes a third contact having a third expiration time longer than the first expiration time and a third priority, where the third priority is lower than the first and the second priority.

\* \* \* \* \*